Figure 1:
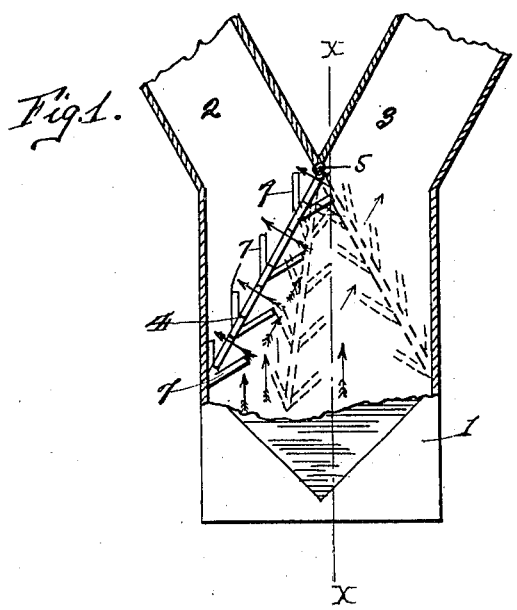

No. 824,945. PATENTED JULY 3, 1906.
P. C. MILLER.
VALVE.
APPLICATION FILED DEC. 4, 1905.

Witnesses
J. W. Carroll
C. M. Burman

Inventor
Philip C. Miller
By his Attorney
Harry Lea Dodson

UNITED STATES PATENT OFFICE.

PHILIP C. MILLER, OF CHICAGO, ILLINOIS.

VALVE.

No. 824,045.  Specification of Letters Patent.  Patented July 3, 1906.

Application filed December 4, 1905. Serial No. 290,078.

*To all whom it may concern:*

Be it known that I, PHILIP C. MILLER, a citizen of the United States, residing at Chicago, in the county of Cook and State of Illinois, have invented certain new and useful Improvements in Valves, of which the following is a specification.

My invention is for use in connection with blowpipe systems where fans are used for handling solid matter, principally shavings and dust, and is placed in the discharge-pipe of the blowpipe system where the material is carried through a pipe and it is desired to deflect part of the material and to deposit it or discharge it at different points. This is generally done by means of a V placed to a junction where the separation of the material is desired to be effected. In order to carry the material along, it is under present conditions necessary to have the two branch pipes of the same diameter as the main feed-pipe. This is a very considerable expense, and especially where a long run is necessary, it sometimes being the case that the material has to be carried one thousand or fifteen hundred feet. Attempts have been made to insert a valve at the point of junction, so that you can close off one or the other of the branch pipes. This is subjected to two serious objections: first, that it does not assist in changing the diameter of the branch pipes, and, second, where it is swung from a central point to close the desired pipe it is necessary in a valve of this kind that it should be loose in order to swing sufficiently free. The result is that portions of the material are carried past, over, under, and around the said valve and deposited in the idle pipe. There being no air to carry it along, it banks up and results in an effectual stoppage of this pipe, so that when you swing the valve back the pipe has to be cleaned out before it will be of any use.

The only device with which I am familiar where it has been possible to use a smaller diameter of pipe for the branch pipes and still produce the results is where a valve is placed in connection with a series of deflectors to catch and turn the lighter material carried in the air toward the bottom of the pipe and in this way deflect it into the desired pipe. This is subject to the very serious objection that, especially on a long run, it is desirable to keep the shavings or other material in the air, while its tendency is constantly to settle to the bottom of the pipe and eventually clog up the pipe.

My invention has for its object to remedy these objectionable features and to produce a valve which will deflect any desired portion of the material in the desired direction and will at the same time permit the passage of such air through the opposite branch, which is closed to the passage of material, so that there will be a sufficient area for the passage of air through the two pipes, and as a consequence it will not be necessary to have branch pipes of so great a diameter as the main supply-pipe, so long as the sum of their combined areas equals the main pipe, a very valuable feature commercially, as in a long run the expense of the pipe is very considerable.

My method of accomplishing the foregoing may be more readily understood by having reference to the accompanying drawings, which are a part of this specification and are hereunto annexed, in which—

Figure 2:
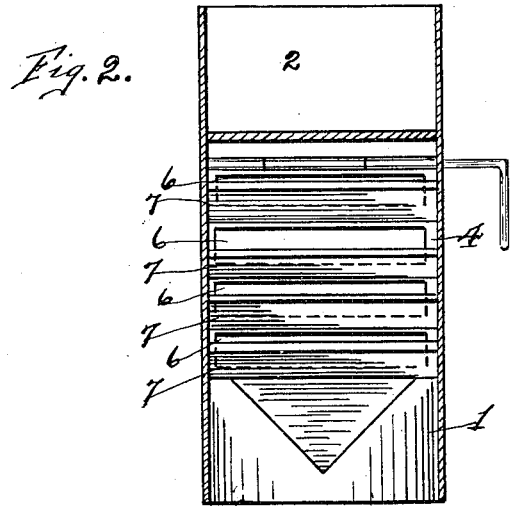
Figure 3:
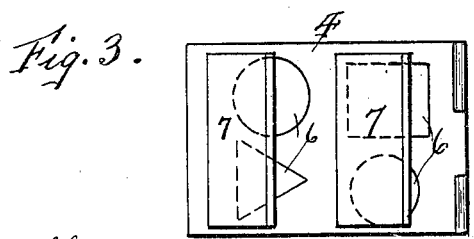

Figure 1 is a sectional plan view showing my invention in connection with the feed-pipes. Fig. 2 is a view taken on line X X in the direction indicated by the arrows. Fig. 3 is a detail view of a modified form of construction of the valve.

Similar figures refer to similar parts throughout the entire description.

In the drawings, 1 is a supply-pipe having branches 2 and 3. The valve 4 is placed at the junction of the two pipes 2 and 3 and may be mounted upon a hinge 5 or in any other suitable manner. This valve swings, as indicated by the dotted lines, and may be made to close either the pipe 2 or 3 or may be swung to any desired point in the pipe 1, and thus will deflect any desired percentage of the material in the direction wanted.

A series of openings 6 are arranged in the valve 4, the sum of the areas of these openings being equal to a desired area or more. Shields 7 are placed over these openings, the result being that when the air carrying the shavings or other material strikes the face of the valve when it is in the position shown in Fig. 1 the material is deflected by the guards or shields 7, while the surplus air, following the direction indicated by the arrows, passes through the openings and into the opposite pipe, thus keeping this pipe free from light material, which may be carried through the openings 7. It is obvious that these openings may be in any desired shape, and the construction of the shields may be varied considerably without departing from the spirit of my invention, which is to provide for the deflection of the material into the desired direction and permit the escape of the surplus quantity of air. A series of openings might be used, as shown in the drawings, Fig. 1, or openings similar to those shown in the modified view may be used, or it may be found desirable in some cases to have one opening and the shield extending over and around this. Any of these changes would be mere mechanical alterations and would not deviate from the spirit of my invention.

Having fully described my invention, what I regard as new, and desire to secure by Letters Patent, is—

1. In a device of the character described, the combination with a feed-pipe having branches, of a valve located at the junction of said branches, there being openings of the desired area in said valve, guards or shields arranged for said openings to deflect and prevent the material passing through said openings, for the purpose set forth.

2. In a device of the character described, the combination with a feed-pipe having branches, of means to deflect the material in the desired direction, there being in said means for deflection means to permit the escape of the surplus air, and means to prevent the passage of the material through said means for escape, for the purpose set forth.

3. In a device of the character described, the combination with a feed-pipe having branches, of a valve to deflect the material in a desired direction, there being means to permit the escape of the surplus air therein, and means to prevent the passage of the material through the said escape, for the purpose set forth substantially as described.

PHILIP C. MILLER.

Witnesses:
J. H. CARROLL,
H. L. DODSON.